US007789068B2

(12) United States Patent
Serra et al.

(10) Patent No.: US 7,789,068 B2
(45) Date of Patent: Sep. 7, 2010

(54) CONTROL METHOD OF A DIRECT INJECTION SYSTEM OF THE COMMON RAIL TYPE PROVIDED WITH A HIGH-PRESSURE FUEL PUMP

(75) Inventors: Gabriele Serra, S. Lazzaro Di Savena (IT); Matteo De Cesare, Torremaggiore (IT); Giovanni Prodi, Bologna (IT)

(73) Assignee: Magneti Marelli Powertrain S.p.A. (IT)

( * ) Notice: Subject to any disclaimer, the term of this patent is extended or adjusted under 35 U.S.C. 154(b) by 37 days.

(21) Appl. No.: 12/234,914

(22) Filed: Sep. 22, 2008

(65) Prior Publication Data

US 2009/0139489 A1 Jun. 4, 2009

(30) Foreign Application Priority Data

Sep. 26, 2007 (EP) .................................. 07425598

(51) Int. Cl.
*F02M 57/02* (2006.01)
*G01M 19/00* (2006.01)

(52) U.S. Cl. .................... 123/446; 123/447; 73/114.26; 73/114.27

(58) Field of Classification Search ................. 123/445, 123/446, 447, 458, 467, 496, 506, 500, 501; 73/114.26, 114.27
See application file for complete search history.

(56) References Cited

U.S. PATENT DOCUMENTS 5,313,924 A * 5/1994 Regueiro .................... 123/456
5,564,391 A * 10/1996 Barnes et al. ............... 123/446
5,678,521 A * 10/1997 Thompson et al. .......... 123/447
6,085,727 A * 7/2000 Nakano ...................... 123/447
6,105,554 A * 8/2000 Nishiyama .................. 123/436
6,116,870 A 9/2000 Kraemer ..................... 417/490
6,135,090 A * 10/2000 Kawachi et al. ............. 123/446
6,164,264 A * 12/2000 Thomas ...................... 123/300
6,192,864 B1 * 2/2001 Nishimura .................. 123/458

(Continued)

FOREIGN PATENT DOCUMENTS

DE 100 23 227 11/2001

(Continued)

OTHER PUBLICATIONS

European Patent Office Action issued on Mar. 19, 2009 in connection with corresponding European patent application No. 07425598.5.

(Continued)

*Primary Examiner*—Thomas N Moulis
(74) *Attorney, Agent, or Firm*—Ostrolenk Faber LLP

(57) ABSTRACT

A control method of a direct injection system of the common rail in an internal combustion engine; the control method contemplates the steps of: feeding the pressurized fuel to a common rail by means of a high-pressure pump presenting at least one pumping element mechanically operated by a drive shaft of the internal combustion engine; measuring the angular position of the drive shaft; measuring the fuel pressure in the common rail; analyzing the oscillations of the fuel pressure in the common rail; and determining the phase of the pumping element of the high-pressure pump with respect to the drive shaft according to the oscillations of the fuel pressure in the common rail.

13 Claims, 1 Drawing Sheet

U.S. PATENT DOCUMENTS

| | | | | |
|---|---|---|---|---|
| 6,257,204 | B1 * | 7/2001 | Kamijo et al. | 123/456 |
| 6,343,588 | B1 * | 2/2002 | Onishi et al. | 123/506 |
| 6,349,702 | B1 * | 2/2002 | Nishiyama | 123/456 |
| 6,353,791 | B1 | 3/2002 | Tuken et al. | |
| 6,505,608 | B2 * | 1/2003 | Hiraku et al. | 123/458 |
| 6,526,947 | B2 * | 3/2003 | Shimada et al. | 123/495 |
| 6,694,953 | B2 * | 2/2004 | Barnes et al. | 123/500 |
| 6,725,837 | B2 * | 4/2004 | Hiraku et al. | 123/436 |
| 6,971,370 | B2 * | 12/2005 | Suenaga et al. | 123/436 |
| 7,267,106 | B2 * | 9/2007 | Adachi et al. | 123/436 |
| 7,299,790 | B2 * | 11/2007 | Okamoto et al. | 123/506 |
| 7,500,471 | B2 * | 3/2009 | Adachi et al. | 123/436 |
| 7,546,832 | B2 * | 6/2009 | Okamoto et al. | 123/506 |
| 7,591,239 | B2 * | 9/2009 | Okamoto | 123/179.17 |
| 2001/0032619 | A1 * | 10/2001 | Nishiyama | 123/456 |
| 2005/0126539 | A1 * | 6/2005 | Okamoto | 123/446 |
| 2009/0082939 | A1 * | 3/2009 | Iihoshi et al. | 701/103 |

FOREIGN PATENT DOCUMENTS

| | | |
|---|---|---|
| DE | 103 60 332 | 7/2005 |
| EP | 0 481 964 | 4/1992 |
| EP | 1 674 718 | 6/2006 |

OTHER PUBLICATIONS

International Search Report mailed Feb. 21, 2008 in corresponding European Application No. 07425598.5.

* cited by examiner

CONTROL METHOD OF A DIRECT INJECTION SYSTEM OF THE COMMON RAIL TYPE PROVIDED WITH A HIGH-PRESSURE FUEL PUMP

TECHNICAL FIELD

The present invention relates to a control method of an direct injection system of the common rail type provided with a high-pressure fuel pump.

BACKGROUND ART

In a direct injection system of the common rail type, a high-pressure pump receives a flow of fuel from a tank by means of a low-pressure pump and feeds the fuel to a common rail hydraulically connected to a plurality of injectors. The pressure of the fuel in the common rail must be constantly controlled according to the engine point either by varying the instantaneous flow rate of the high-pressure pump or by constantly feeding an excess of fuel to the common rail and by discharging the fuel in excess from the common rail itself by means of an adjustment valve. Generally, the solution of varying the instantaneous flow rate of the high-pressure pump is preferred, because it presents a much higher energy efficiency and does not cause an overheating of the fuel.

In order to vary the instantaneous flow rate of the high-pressure pump, there has been suggested a solution of the type presented in patent application EP0481964A1 or in U.S. Pat. No. 6,116,870A1 which describe the use of a variable flow rate high-pressure pump capable of feeding the common rail only with the amount of fuel needed to maintain the fuel pressure in the common rail equal to the desired value; specifically, the high-pressure pump is provided with an electromagnetic actuator capable of varying the flow rate of the high-pressure pump instant-by-instant by varying the closing instant of an intake valve of the high-pressure pump itself.

Alternatively, in order to vary the instantaneous flow rate of the high-pressure pump, it has been suggested to insert upstream of the pumping chamber a flow rate adjustment device comprising a continuously variable section bottleneck which is controlled according to the required pressure in the common rail.

However, both the above-described solutions for varying the instantaneous flow rate of the high-pressure pump are mechanically complex and do not allow to adjust the instantaneous flow rate of the high-pressure pump with high accuracy. Furthermore, the flow rate adjustment device comprising a variable section bottleneck presents a small passage section in case of small flow rates and such small passage section determines a high local pressure loss (local load loss) which may compromise the correct operation of an intake valve which adjusts the fuel intake into a pumping chamber of the high-pressure pump.

For this reason, there has been suggested a solution of the type presented in patent application EP1612402A1, which relates to a high-pressure pump comprising a number of pumping elements operated in reciprocating motion by means of corresponding intake and delivery strokes in which each pumping element is provided with a corresponding intake valve in communication with an intake pipe fed by a low-pressure pump. On the intake pipe there is arranged a shut-off valve controlled in a choppered manner for adjusting the instantaneous fuel flow rate fed to the high-pressure pump; in other words, the shut-off valve is a valve of the open/closed (on/off) type which is driven by modifying the ratio between the opening time and the closing time so as to vary the instantaneous fuel flow rate fed to the high-pressure pump. In this manner, the shut-off valve always presents an efficaciously wide passage section which does not determine an appreciable local pressure loss (local load loss).

The shut-off valve is controlled synchronously with respect to the mechanical actuation of the high-pressure pump (which is performed by a mechanical transmission which receives the motion from the drive shaft) by means of a driving frequency of the shut-off valve having a constant internal synchronization ratio, predetermined according to the pumping frequency of the high-pressure pump (typically, one opening/closing cycle of the shut-off valve is performed for each pumping stroke of the high-pressure pump). It has been observed that there is a rather narrow critical angle at each pumping of the high-pressure pump; if the opening command of the shut-off valve is given at the critical angle, irregularities in the fuel delivery to the high-pressure pump may occur and such delivery irregularities subsequently cause a perturbation of the fuel pressure in the common rail.

In order to avoid sending the opening command of the shut-off valve at the critical pumping angle of the high-pressure pump, it has been suggested to phase the shut-off valve commands according to the pumping of the high-pressure pump; however such a solution requires to accurately know the pumping phase of the high-pressure pump (i.e. the mechanical actuation phase of the high-pressure pump) and thus forces to install an angular encoder in the high-pressure pump with a considerable increase of the costs (an angular encoder is a very expensive sensor and is rather cumbersome).

Alternatively to the installation of an angular encoder in the high-pressure pump, it is possible to use the signal provided with the phonic wheel which instantaneously detects the angular position of the drive shaft from which the motion which operates the high pressure pump is taken; however, in this case, it is necessary to perform a precision construction and assembly of the mechanical transmission which derives the motion from the drive shaft to operate the high-pressure pump and of the high-pressure pump itself with a considerable increase in the construction and assembly costs of such components. In other words, the mechanical transmission which operates the high-pressure pump receives the motion from the drive shaft and thus presents an actuation frequency proportional to the revolution speed of the drive shaft (consequently, by knowing the revolution speed of the drive shaft the actuation frequency of the mechanical transmission which operates the high pressure pump is immediately known); however, due to construction and assembly limitations, the mechanical transmission which operates the high-pressure pump cannot guarantee the respect of the predetermined phase with respect to the drive shaft and thus the phase between the mechanical transmission which actuates the high-pressure pump and the drive shaft cannot be known in advance.

DISCLOSURE OF INVENTION

It is the object of the present invention to provide a control method of a direct injection system of the common rail type provided with a high-pressure fuel pump, such a control method being free from the above-described drawbacks and, specifically, being easy and cost-effective to implement.

According to the present invention, a control method of a common rail type system provided with a high-pressure fuel pump is provided as recited in the attached claims.

BRIEF DESCRIPTION OF THE DRAWING

The present invention will now be described with reference to the accompanying drawing illustrating a non-limitative embodiment thereof; specifically, the accompanying FIGURE is a diagrammatic view of an injection system of the common rail type which implements the control method object of the present invention.

PREFERRED EMBODIMENTS OF THE INVENTION

Figure 1:
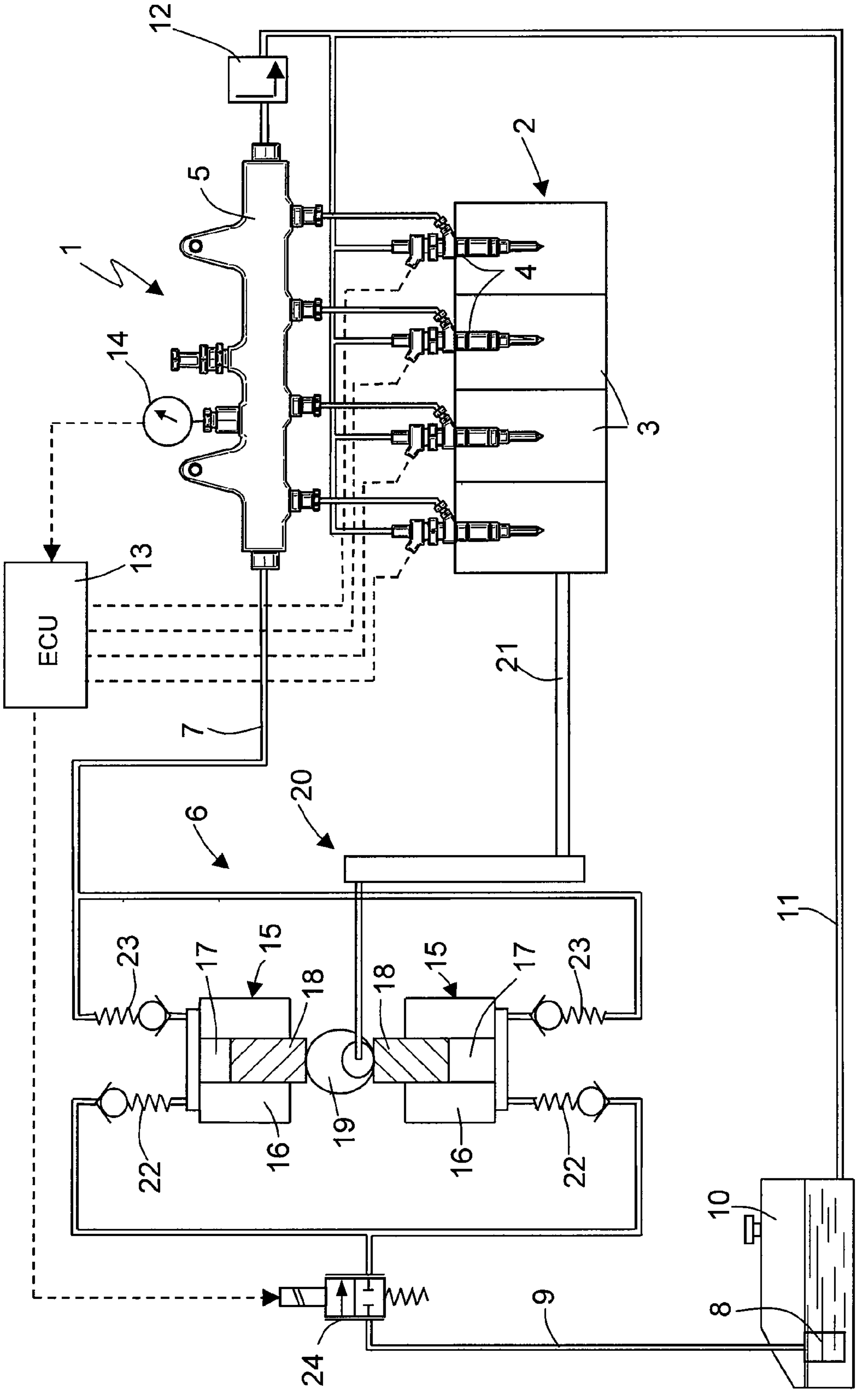

In the accompanying FIGURE, numeral 1 indicates a common rail type system as a whole for the direct fuel injection into an internal combustion engine 2 provided with four cylinders 3. The injection system 1 comprises four injectors 4, each of which presents a hydraulic needle actuation system and is adapted to inject fuel directly into a corresponding cylinder 3 of the engine 2 and to receive the pressurized fuel from a common rail 5.

A variable delivery high-pressure pump 6 feeds the fuel to the common rail 5 by means of a delivery pipe 7. In turn, the high-pressure pump 6 is fed by a low-pressure pump 8 by means of an intake pipe 9 of the high-pressure pump 6. The low-pressure pump 8 is arranged inside a fuel tank 10, onto which a discharge channel 11 of the fuel in excess of the injection system 1 leads, such a discharge channel 11 receiving the fuel in excess both from the injectors 4 and from a mechanical pressure-relief valve 12 which is hydraulically coupled to the common rail 5. The pressure-relief valve 12 is calibrated to automatically open when the fuel pressure $P_{rail}$ in the common rail 5 exceeds a safety value which ensures the tightness and the safety of the injection system 1.

Each injector 4 is adapted to inject a variable amount of fuel into the corresponding cylinder 3 under the control of an electronic control unit 13. As previously mentioned, the injectors 4 present a hydraulic actuation of the needle and are thus connected to the discharge channel 11, which presents a pressure slightly higher than ambient pressure and leads upstream of the low-pressure pump 8 directly into the tank 10. For its actuation, i.e. for injecting fuel, each injector 4 draws a certain amount of pressurized fuel which is discharged into the discharge channel 11.

The electronic control unit 13 is connected to a pressure sensor 14 which detects the fuel pressure $P_{rail}$ in the common rail 5 and, according to the fuel pressure $P_{rail}$ in the common rail 5, controls in feedback the flow rate of the high-pressure pump 6; in this manner, the fuel pressure $P_{rail}$ in the common rail 5 is maintained equal to a desired value variable in time according to the engine point (i.e. according to the operating conditions of the engine 2).

The high-pressure pump 6 comprises a pair of pumping elements 15, each formed by a cylinder 16 having a pumping chamber 17, in which a mobile piston 18 slides in reciprocating motion pushed by a cam 19 operated by a mechanical transmission 20 which receives the motion from a drive shaft 21 of the internal combustion engine 2. Each compression chamber 17 is provided with a corresponding intake valve 22 in communication with the intake pipe 9 and a corresponding delivery valve 23 in communication with the delivery pipe 7. The two pumping elements 15 are reciprocally operated in phase opposition and therefore the fuel sent to the high-pressure pump 6 through the intake pipe 9 is only taken in by one pumping element 15 at a time, the one which in that instant is performing the intake stroke (in the same instant, the intake valve 22 of the other pumping element 15 is certainly closed being the other pumping element 15 at compression phase).

Along the intake pipe 9 there is arranged a shut-off valve 24, which presents an electromagnetic actuation, is controlled by the electronic control unit 13 and is of the open/closed (on/off) type; in other words, the shut-off valve 24 may only assume either an entirely open position or an entirely closed position. Specifically, the shut-off valve 24 presents an efficaciously wide introduction section so as to allow to sufficiently feed each pumping element 17 without causing any pressure drop.

The fuel pressure variation $dP_{rail}/dt$ in the common rail 5 results from the following state equation of the common rail 5:

$$dP_{rail}/dt=(k_b/V_r)\times(m_{HP}-m_{Inj}-m_{Leak}-m_{BackFlow}) \quad [1]$$

$dP_{rail}/dt$ is the fuel pressure variation in the common rail 5;

$k_b$ is the fuel bulk module;

$V_r$ is the volume of the common rail 5;

$m_{HP}$ is the fuel flow rate from the high-pressure pump 6;

$m_{Inj}$ is the injector fuel flow rate in cylinders 3 of the injectors 4;

$m_{Leak}$ is the fuel flow rate lost by leakage (mostly by the injectors 4);

$m_{BackFlow\ rate}$ is the fuel flow rate drawn by the injectors 4 for their actuation and discharged into the discharge channel 11.

From the equation shown above, it is apparent that the fuel pressure variation $dP_{rail}/dt$ in the common rail 5 is positive if the fuel flow rate $m_{HP}$ of the high pressure pump 6 is higher than the sum of the fuel flow rate $m_{Inj}$ injected into the cylinders 3 by the injectors 4, of the fuel flow rate lost by leakage $m_{Leak}$ and of the fuel flow rate $m_{BackFlow}$ drawn by the injectors 4 for their actuation and discharged into the discharge channel 11. It is worth observing that the fuel flow rate $m_{Inj}$ injected into the cylinders 3 by the injectors 4 and the fuel flow rate $m_{BackFlow}$ drawn by the injectors 4 for their actuation and discharged into the discharge channel 11 are extremely variable (and may even be zero) according to the driving mode of the injectors 4, while the fuel flow rate lost by leakage $m_{Leak}$ is rather constant (it presents only a slight increase as the fuel pressure $P_{rail}$ in the common rail 5 increases) and is always present (i.e. is never zero).

The flow rate of the high-pressure pump 6 is controlled only by using shut-off valve 24 which is controlled in a choppered manner by the electronic control unit 13 according to the fuel pressure $P_{rail}$ in the common rail 5. Specifically, the electronic control unit 13 determines instant-by-instant the desired value of the fuel pressure $P_{rail}$ in the common rail 5 according to the engine point and consequently adjusts the instantaneous fuel flow rate fed by the high-pressure pump 6 to the common rail 5 so as to follow the desired value of the fuel pressure $P_{rail}$ in the common rail 5 itself. In order to adjust the instantaneous fuel flow rate fed by the high-pressure pump 6 to the common rail 5, the electronic control unit 13 adjusts the instantaneous flow rate taken in by the high-pressure pump 6 through the shut-off valve 24 by varying the ratio between the duration of the opening time and the duration of the closing time of the shut-off valve 24.

In other words, the electronic control unit 13 cyclically controls the opening and the closing of the shut-off valve 24 to choke the fuel flow rate taken in by the high-pressure pump 6 and adjusts the fuel flow rate taken in by the high-pressure pump 6 by varying the ratio between the duration of the opening time and the duration of the closing time of the shut-off valve 24. By varying the ratio between the duration of the opening time and the duration of the closing time of the shut-off valve 24, the percentage of opening time of the shut-off valve 24 is varied with respect to the duration of the pump revolution of the high-pressure pump 6. During the opening time of the shut-off valve 24, the high-pressure pump 6 takes in the maximum flow rate which may cross the shut-off valve 24, while during the closing time of the shut-off valve 24 the high-pressure pump 6 does not take in anything; in this manner, it is possible to obtain an average pump revolution flow rate of the high-pressure pump 6 variable between a maximum value and zero.

It has been observed that in each pumping of the high-pressure pump 6 there is a rather narrow critical angle; if the opening command of the shut-off valve 24 is given at the critical angle, irregularities in the fuel delivery to the high-pressure pump 6 may occur and such delivery irregularities subsequently cause a perturbation of the fuel pressure $P_{rail}$ in the common rail 5.

According to a preferred embodiment, the electronic control unit 13 drives the shut-off valve 24 synchronously with respect to the mechanical actuation of the high-pressure pump 6 (which is performed by the mechanical transmission 20 which receives the motion from the drive shaft 21) by means of a driving frequency of the shut-off valve 24 having a constant integer synchronization ratio, predetermined according to the pumping frequency of the high-pressure pump 6 (typically, one opening/closing cycle of the shut-off valve 24 is performed for each pumping of the high-pressure pump 6). In order to avoid to give the opening command of the shut-off valve 24 at the critical angle, the electronic control unit 13 appropriately phases the opening command of the shut-off valve 24 with respect to the mechanical actuation of the high-pressure pump 6 (i.e. with respect to the angular position of the drive shaft 21 from where the motion for actuating the high-pressure pump 6 is taken); consequently, the electronic control unit 13 must know the phase of the pumping elements 15 of the high-pressure pump 6 with respect to the drive shaft 21 at least with fair accuracy.

In other words, the electronic control unit 13 phases the driving of the shut-off valve 24 with respect to the mechanical actuation of the high-pressure pump 6 (i.e. with respect to the angular position of the drive shaft 21 from where the motion for actuating the high-pressure pump 6 is taken) so that the opening command of the shut-off valve 24 is given at a desired angular position which is outside the critical angle of the high-pressure pump 6.

In order to estimate the phase of the pumping elements 15 of the high-pressure pump 6 with respect to the drive shaft 21, the electronic control unit 13 measures in known manner the angular position of the drive shaft 21 by means of a phonic wheel (not shown) keyed onto the drive shaft 21 itself, measures in known manner the fuel pressure $P_{rail}$ in the common rail 5 by means of the pressure sensor 14, analyses the oscillations of the fuel pressure $P_{rail}$ in the common rail 5, and determines the phase of the pumping elements 15 of the high-pressure pump 6 with respect to the drive shaft 21 according to the oscillations of the fuel pressure $P_{rail}$ in the common rail 5.

Preferably, the electronic control unit 13 determines the phase of the pumping elements 15 of the high-pressure pump 6 with respect to the drive shaft 21 according to the oscillations of the fuel pressure $P_{rail}$ in the common rail 5 when there is no fuel injection, i.e. during the step of pressurizing of the common rail 5 when the internal combustion engine 2 is cranked or during the cut-off step of the internal combustion engine 2. Specifically, the electronic control unit 13 determines the phase of the pumping elements 15 during a cut-off phase of the internal combustion engine 2 only when the fuel pressure $P_{rail}$ in the common rail 5 is higher than the predetermined threshold value (i.e. after the pressure $P_{rail}$ has reached an essentially stationary value) and/or only when the rotation speed of the drive shaft 21 is included in a predetermined measurement range; in this manner, it is possible to make the information present in the pressure signal more evident by increasing the accuracy in the determination of the phase of the pumping elements 15.

According to the foregoing equation [1], when there is no fuel injection the fuel pressure $P_{rail}$ in the common rail 5 increases by effect of the fuel flow rate $m_{HP}$ of the high-pressure pump 6 and drops by effect of the fuel flow rate $m_{Leak}$ lost by leakage. The fuel flow rate $m_{Leak}$ lost by leakage is rather constant (it presents only a slight increase as the fuel pressure $P_{rail}$ in the common rail 5 increases) and is always present (i.e. it is never zero), while the fuel flow rate $m_{HP}$ of the high-pressure pump 6 has a variable trend having zero value at TDC (Top Dead Centre) of the pumping elements 15 of the high-pressure pump 6; consequently, when there is no fuel injection, the fuel pressure $P_{rail}$ in the common rail 5 has a variable trend having the maximum values at TDC (Top Dead Centre) of the pumping elements 15 of the high-pressure pump 6.

In order to determine the phase of the pumping elements 15 of the high-pressure pump 6 with respect to the drive shaft 21, the electronic control unit 13 determines the angular position of the drive shaft 21 at which the fuel pressure $P_{rail}$ in the common rail 5 reaches a relative maximum and determines the angular position of the drive shaft 21 at which the TDC of each pumping element 15 occurs according to the angular position of the drive shaft 21 in which the fuel pressure $P_{rail}$ in the common rail 5 reaches a relative maximum. According to a first embodiment, the angular position of the drive shaft 21 at which the TDC (Top Dead Centre) of each pumping element 15 occurs is estimated equal to the angular position of the drive shaft 21 in which the fuel pressure $P_{rail}$ in the common rail 5 reaches a relative maximum. According to an alternatively embodiment, the angular position of the drive shaft 21 at which the TDC of each pumping element 15 occurs is estimated equal to the angular position of the drive shaft 21 in which the fuel pressure $P_{rail}$ in the common rail 5 reaches a maximum corrected by an angular correction value; preferably, the angular correction value is algebraically added to the angular position of the drive shaft 21 at which the fuel pressure $P_{rail}$ in the common rail 5 reaches a relative maximum and may be either constant or variable according to the revolution speed of the drive shaft 21, the fuel pressure $P_{rail}$ in the common rail 5 and/or the fuel flow rate $m_{Leak}$ lost by leakage. The angular correction value takes into account the hydraulic inertias which determine an offset between the TDC of each pumping element 15 and the pressure peak in the common rail 5.

If the measuring frequency (i.e. the sampling frequency) of the fuel pressure $P_{rail}$ in the common rail 5 is sufficiently high (i.e. considerably higher than the actuation frequency of the high-pressure pump 6), the electronic control unit 13 detects a sequence of measurements of the fuel pressure $P_{rail}$ in the common rail 5 during a pumping cycle correlating to each measurement the corresponding angular position of the drive shaft 21 at the time of the measurement, identifies by means of mathematical comparisons the highest measurement and establishes that the highest measurement is the relative maximum. Such a method is extremely simple but on the other hand requires the measuring frequency (i.e. the sampling frequency) of the fuel pressure $P_{rail}$ in the common rail 5 to be high with a consequent non negligible load on the electronic control unit 13.

Alternatively, in the electronic control unit 13 there is stored a variation model of the fuel pressure $P_{rail}$ in the common rail 5 according to the position of the pumping elements 15 of the high-pressure pump 6. In use, the electronic control unit 13 detects a sequence of measurements of the fuel pressure $P_{rail}$ in the common rail 5 during a pumping cycle correlating to each measurement the corresponding angular position of the drive shaft 21 at the time of the measurement, and estimates the angular position of the drive shaft 21 at which the fuel pressure $P_{rail}$ in the common rail 5 reaches a relative maximum by using the variation model of the fuel pressure $P_{rail}$ combined with the fuel pressure $P_{rail}$ measurements.

For example, the variation model of the fuel pressure $P_{rail}$ in the common rail 5 may be represented by the following equations:

$$\frac{dP_{rail}}{dt} = \frac{k_b}{V_r} \cdot (m_{HP} = m_{inj} - m_{leak} - m_{Backflow}) \qquad [2]$$

$$m_{HP} = \eta \cdot \frac{V_p}{2} \cdot \int_{\theta_0}^{\pi} \sin\theta(t)\,dt \qquad [3]$$

$P_{rail}$ is the fuel pressure in the common rail 5;

$k_b$ is the fuel bulk module;

$V_r$ is the volume of the common rail 5;

$m_{HP}$ is the fuel flow rate from the high-pressure pump 6;

$m_{Leak}$ is the fuel flow rate lost by leakage;

$m_{inj}$ is the injector flow rate lost by leakage;

$m_{Backflow}$ is the fuel flow rate drawn by the injectors 4 for their actuation and discharge into the discharge channel 11;

$V_p$ is the volume of each pumping element 15 of the high-pressure pump 6;

$\eta$ is the efficiency of the high-pressure pump 6 determined experimentally during the step of designing and tuning;

$\theta_0$ is the initial angle of delivery which essentially depends on the fuel pressure $P_{rail}$ in the common rail 5 and on the revolution speed of the drive shaft 21 (i.e. on the actuation speed of the high-pressure pump 6);

$\theta$ is the rotation angle of the high-pressure pump 6.

The fuel flow rate $m_{Leak}$ lost by leakage may be estimated by the electronic control unit 13 when there is no injection and the fuel flow rate $m_{HP}$ of the high-pressure pump 6 is zero by analyzing the decay of the fuel pressure $P_{rail}$ in the common rail 5; specifically, the following equation [4] which derives from the aforesaid equation [1] is used:

$$dP_{rail}/dt=(k_b/V_r)\times(-m_{Leak}) \qquad [4]$$

$dP_{rail}/dt$ is the fuel pressure variation in the common rail 5;

$k_b$ is the fuel bulk module;

$V_r$ is the volume of the common rail 5;

$m_{Leak}$ is the fuel flow rate lost by leakage (mostly by the injectors 4).

In other words, the contribution of the fuel flow rate $m_{Leak}$ lost by leakage is eliminated from the trend of the acquired fuel pressure $P_{rail}$ in the common rail 5 and the measured trend of the fuel pressure $P_{rail}$ due exclusively to the high-pressure pump 6 is obtained; the sought phasing is obtained by comparing the measured trend of the fuel pressure $P_{rail}$ due exclusively to the high-pressure pump 6 against the corresponding theoretical trend provided by the equation [3].

It is worth underlining that the electronic control unit 13 preferably performs various estimates of the phase of the pumping elements 15 of the high-pressure pump 6 with respect to the drive shaft 21 in various, subsequent times and determines the possibly weighed mathematical average of the various estimates; the procedure is repeated until the obtained average is stabilized.

The above-described method for estimating the phase of the pumping elements 15 of the high-pressure pump 6 with respect to the drive shaft 21 presents many advantages because it allows to effectively (i.e. with rapidity and accuracy) and efficiently (i.e. with a minimum use of resources) determine the phase of the pumping elements 15 of the high-pressure pump 6 with respect to the drive shaft 21. Specifically, it is worth observing that the above-described estimation method of the phase of the pumping elements 15 of the high-pressure pump with respect to the drive shaft 21 is cost-effective and simple to implement in an injection system of the common rail type because it does not require the installation of any additional component with respect to those normally present.

In virtue of the above-described estimation method of the phase of the pumping elements 15 of the high-pressure pump 6 with respect to the drive shaft 21, it is possible to avoid to perform an expensive precision assembly contemplating during the step of assembling the keying of the high-pressure pump 6 at a precise angle with respect to the basic angle of the internal combustion engine 2.

The invention claimed is:

1. A control method of a direct injection system of the common rail in an internal combustion engine; the control method comprises the steps of:

feeding the pressurized fuel to a common rail by means of a high-pressure pump presenting at least one pumping element mechanically operated by a drive shaft of the internal combustion engine;

measuring the angular position of the drive shaft;

measuring the fuel pressure ($P_{rail}$) in the common rail;

analyzing the oscillations of the fuel pressure ($P_{rail}$) in the common rail; and determining phase of the pumping element of the high-pressure pump with respect to the drive shaft according to the oscillations of the fuel pressure ($P_{rail}$) in the common rail when there is no injection;

wherein the step of determining the phase of the pumping element of the high-pressure pump with respect to the drive shaft comprises the further steps of: determining the angular position of the drive shaft at which the fuel pressure ($P_{rail}$) in the common rail reaches a relative maximum; and determining the angular position of the drive shaft at which the TDC of the pumping element occurs according to the angular position of the drive shaft at which the fuel pressure ($P_{rail}$) in the common rail reaches a relative maximum; and wherein the step of determining the angular position of the drive shaft in which the fuel pressure ($P_{rail}$) in the common rail reaches a relative maximum comprises the further steps of: determining a variation model of the fuel pressure ($P_{rail}$) in the common rail according to the position of the pumping element of the high pressure pump; detecting a sequence of measurements of the fuel pressure ($P_{rail}$) in the common rail during a pumping cycle by correlating the corresponding angular position of the drive shaft at the time of the measurement to each measurement; and estimating the angular position of the drive shaft at which the fuel pressure ($P_{rail}$) in the common rail reaches a relative maximum using the variation model of the fuel pressure ($P_{rail}$) combined with the measurements of the fuel pressure ($P_{rail}$).

2. A control method according to claim 1, and comprising the further steps of:

feeding the fuel to the high-pressure pump by means of a shut-off valve;

cyclically controlling the opening and the closing of the shut-off valve for choking the flow rate of fuel taken in by the high-pressure pump itself;

adjusting the flow rate of fuel taken in by the high-pressure pump by varying the ratio between the duration of the opening time and the duration of the closing time of the shut-off valve; and driving the shut-off valve synchronously with the mechanical actuation of the high-pressure pump and thus with the revolution of the drive shaft.

3. A control method according to claim 2, and comprising the step of phasing the driving of the shut-off valve with respect to the mechanical actuation of the high-pressure pump so that the opening of the shut-off valve is given at a desired angular position with respect to the mechanical actuation of the high-pressure pump and thus with respect to the drive shaft.

4. A control method according to claim 2, and comprising the further steps of:

determining at least one critical angle of the high-pressure pump; and phasing the driving of the shut-off valve with respect to the mechanical actuation of the high-pressure pump and thus with respect to the rotation of the drive shaft so that the opening control of the shut-off valve is given outside the critical angle of the high-pressure pump.

5. A control method according to claim 1, wherein the phase of the pumping element is determined during a phase of pressurization of the common rail when the internal combustion engine is started.

6. A control method according to claim 1, wherein the phase of the pumping element is determined during a cut-off phase of the internal combustion engine.

7. A control method according to claim 6, wherein the phase of the pumping element is determined during a cut-off phase of the internal combustion engine only when the fuel pressure ($P_{rail}$) in the common rail is higher than a given predetermined threshold value.

8. A control method according to claim 6, wherein the phase of the pumping element is determined during a cut-off phase of the internal combustion engine only when revolution speed of a drive shaft is comprised in a predetermined measurement range.

9. A control method according to claim 1, wherein the angular position of the drive shaft at which the TDC of the pumping element occurs is estimated according to the angular position of the drive shaft at which the fuel pressure ($P_{rail}$) in the common rail reaches a relative maximum.

10. A control method according to claim 1, wherein the angular position of the drive shaft at which the TDC of the pumping element occurs is estimated according to the angular position of the drive shaft at which the fuel pressure ($P_{rail}$) in the common rail reaches a relative maximum corrected by an angular correction value.

11. A control method according to claim 10, wherein the angular correction value is constant and predetermined.

12. A control method according to claim 10, wherein the angular correction value is variable according to the rotation speed of the drive shaft, to the fuel pressure ($P_{rail}$) in the common rail and/or to a fuel flow rate ($m_{Leak}$) lost by leakage from the common rail.

13. A control method according to claim 1, wherein the variation model of the fuel pressure ($P_{rail}$) in the common rail is represented by the following equations:

$$\frac{dP_{rail}}{dt} = \frac{k_b}{V_r} \cdot (m_{HP} = m_{inj} - m_{leak} - m_{Backflow}) \quad [2]$$

$$m_{HP} = \eta \cdot \frac{V_p}{2} \cdot \int_{\theta_0}^{\pi} \sin\theta(t)\,dt \quad [3]$$

$P_{rail}$ is the fuel pressure in the common rail;

$k_b$ is the fuel bulk module;

$V_r$ is the volume of the common rail;

$m_{HP}$ is the fuel flow rate from the high-pressure pump;

$m_{Leak}$ is the fuel flow rate lost by leakage;

$m_{Inj}$ is the injector fuel flow rate in cylinders of the injectors;

$m_{Backflow}$ is the fuel flow rate drawn by the injectors for their actuation and discharged into the discharge channel;

$V_p$ is the volume of each pumping element of the high-pressure pump;

$\eta$ is the efficiency of the high-pressure pump;

$\theta_0$ is the beginning of the delivery angle;

$\theta$ is the rotation angle of the high-pressure pump.

* * * * *